US006974931B2

(12) United States Patent
Holverson et al.

(10) Patent No.: US 6,974,931 B2
(45) Date of Patent: Dec. 13, 2005

(54) METHOD AND APPARATUS FOR PULSE AND SHORT CIRCUIT ARC WELDING

(75) Inventors: Todd E. Holverson, Appleton, WI (US); Richard M. Hutchison, New London, WI (US); James L. Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 162 days.

(21) Appl. No.: 10/435,624

(22) Filed: May 7, 2003

(65) Prior Publication Data

US 2004/0222203 A1 Nov. 11, 2004

(51) Int. Cl.$^7$ ................................. B23K 9/09
(52) U.S. Cl. ................. 219/130.5; 219/61; 219/130.51
(58) Field of Search ............... 219/130.5, 132, 219/130.31, 130.32, 130.33, 130.51, 137 PS, 219/61

(56) References Cited

U.S. PATENT DOCUMENTS

| 3,581,051 | A | * | 5/1971 | Brown ..................... 219/130.5 |
| 3,668,360 | A | | 6/1972 | Ballis |
| 4,508,954 | A | * | 4/1985 | Kroll .......................... 219/132 |
| 4,608,482 | A | * | 8/1986 | Cox et al. ................... 219/132 |
| 5,278,390 | A | * | 1/1994 | Blankenship ............ 219/130.5 |
| 6,204,476 | B1 | | 3/2001 | Reynolds et al. |

FOREIGN PATENT DOCUMENTS

| EP | 1052051 | | 5/2000 |
| GB | 410870 | | 10/1975 |
| JP | 03297564 | | 12/1912 |
| JP | 07047474 | | 2/1995 |
| JP | 09001340 | | 1/1997 |
| JP | 10-193106 A | * | 7/1998 |
| JP | 10193106 | | 7/1998 |

* cited by examiner

*Primary Examiner*—Clifford C. Shaw
(74) *Attorney, Agent, or Firm*—George R. Corrigan

(57) ABSTRACT

A method and apparatus for multi process welding includes providing a controlled short circuit output and a pulse output in response to a user selection across a workpiece output stud and a torch output stud.

48 Claims, 1 Drawing Sheet

METHOD AND APPARATUS FOR PULSE AND SHORT CIRCUIT ARC WELDING

FIELD OF THE INVENTION

The present invention relates generally to the art of welding. More specifically, it relates to pulse and short circuit welding.

BACKGROUND OF THE INVENTION

There are many known welding processes, used in many different applications. Two well known welding applications are controlled short circuit welding and pulse welding.

Controlled short circuit welding includes waveform controlled short circuit welding and mechanically controlled short circuit welding. Waveform controlled short circuit welding controls the process by controlling the output voltage and current (the power waveform) to have desired values, such as that which will reduce spatter by reducing the pinch force (current) when the liquid-metal bridge of the short is about to break and establish an arc. Mechanically controlled short circuit welding controls the process by controlling the breaking of the short by retracting the wire (mechanically controlling the wire and process) and can reduce the current and/or voltage to a desired level before the wire is retracted.

Known waveform controlled short circuit welders often have a converter or inverter controlled to provide the desired output. Generally, they lower the current prior to the short clearing so that the current is low when the short clears and the arc forms. The current is lowered because the clearing can be an explosive event, and lower current reduces spatter. Such systems attempt to sense or predict the short ending, and lower the current in response thereto. For example, U.S. Pat. Nos. 6,087,626 and 6,326,591 to the present inventors (hereby incorporated by reference), describe a topology and control that are used for short arc welding. They predict the short clearing, and reduce the inverter output before the short clears.

Other waveform controlled short circuit welders include an output bypass switch that shunts a resistance between the power circuitry and the weld. This switch is used to lower the current faster than commanding the inverter (or other power circuit) can lower the current. An example of such a system is found in U.S. Pat. No. 5,001,326 (hereby incorporated by reference), as well as in a number of related patents. Switch 70 of that patent is referred to herein as an output bypass switch because it is on the output of the inverter, and allows the output current to be more quickly reduced than it would be by control of the power circuitry alone. Power circuits used with this sort of system include inverters and dc supplies.

Pulse welding generally consists of the output current alternating between a background current and a higher peak current. Most of the transfer (of the wire to the weld) occurs during the peak state. Pulse MIG welding systems are also well known. They have variety of power topologies, and differ from some waveform controlled short circuit power supplies by having a lesser output inductance, and not having the output bypass switch. They also have a control scheme that provides the pulse power, rather than controlled short circuit power.

Many prior art welding power supplies have either been used for waveform controlled short circuit welding or for pulse (MIG) welding, and have had their power topology and control scheme optimized for the single process. More recently, multi-process welding-type power supplies have become known. Controlled short circuit welding is particularly well suited for performing a root pass on a pipe and pulse (MIG) welding is particularly well suited for performing fill passes on a pipe. Thus multi process waveform controlled short circuit and pulse power supplies may be well suited to pipe welding However, welding-type power supplies that provide waveform controlled short circuit welding power and pulse welding power have two torch output studs—one for the waveform controlled short circuit output and one for the pulse output (and one workpiece stud for the return current path). Thus, after completing the root pass the user must switch weld cables (if two torch cables are present), or move the cable from the controlled short circuit stud to the pulse stud. This is wasteful and/or time consuming.

Accordingly, a multi process controlled short circuit and pulse welding power supply with a single torch output stud that provides both controlled short circuit and a pulse output is desirable.

SUMMARY OF THE PRESENT INVENTION

According to a first aspect of the invention a welding-type power supply includes a source of welding-type power having a control input, and a controller, connected to the control input. The controller includes a controlled short circuit control module, a pulse module and a process selection module. One of the controlled short circuit module and the pulse module are activated in response to the process selection module. Controlled short circuit power and pulse power are provided across a workpiece output stud and a single torch output stud, that are connected to the source of welding-type power.

According to a second aspect of the invention a system for welding includes a source of welding-type power capable of providing a controlled short circuit output and a pulse output in response to a user selection. A workpiece output stud is connected to the source of welding-type power, and a single torch output stud is connected to the source of welding-type power. The torch output stud provides the selected controlled short circuit power or pulse power.

According to a third aspect of the invention, a method of providing welding-type power includes selecting one of a controlled short circuit output and a pulse output in response to a process selection. In the event the controlled short circuit output is selected a source of welding-type power provides the controlled short circuit output across a workpiece output stud and a torch output stud. In the event the pulse output is selected, the source of welding-type power provides the pulse output, across the workpiece output stud and the torch output stud.

According to a fourth aspect of the invention a method for welding includes providing a controlled short circuit output and a pulse output in response to a user selection across a workpiece output stud and a torch output stud.

A wire feeder, is connected to the source of welding-type power, and the workpiece output stud and/or the single torch output stud are located on the wire feeder, or on an external housing, in other embodiments.

The source of welding-type power includes an inverter, without or without an output bypass switch, in various embodiments.

A user selectable process input, connected to the process selection module, is provided in other embodiments. It may be located, for example, on a torch, the source of power, or the wire feeder.

An output selection switch, that is controlled by the process selection module may be between the single torch output stud and the source of welding-type power, in one embodiment. It may also be connected to an output inductance, or an output inductance may be simulated.

The controlled short circuit module is a waveform controlled short circuit module, or a mechanical controlled short circuit module, in various embodiments.

According to a fifth aspect of the invention a method of pipe welding includes providing controlled short circuit welding power across a work stud and a torch stud and performing the root pass using the controlled short circuit power, and then providing controlled pulse welding power across the work stud and the torch stud and filling a groove using pulse power.

The root pass and filling the groove are done with same, or different types of wire in various embodiments. The filler passes are performed without changing welding cables.

Other principal features and advantages of the invention will become apparent to those skilled in the art upon review of the following drawings, the detailed description and the appended claims.

Figure 1:
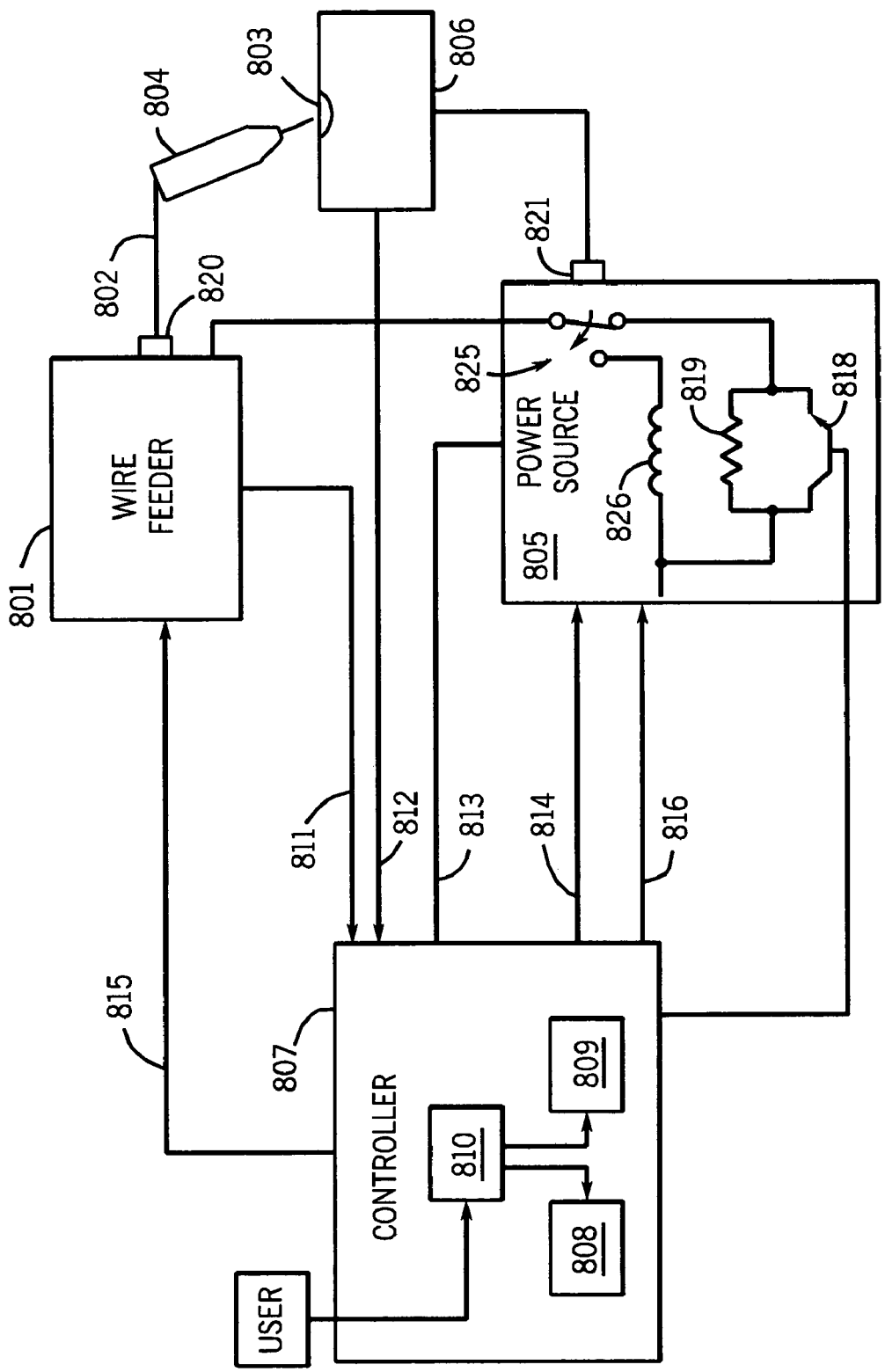
FIG. 1 is a block diagram of a welding-type power supply in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular components and particular topologies controlled with particular schemes, it should be understood at the outset that the invention may also be implemented with other components, topologies, controlled with other schemes, and used in other environments.

Generally, the present invention provides for a multi process controlled short circuit and pulse welding power supply with a single torch output stud (located on the wire feeder or the source of power) that provides both the controlled short circuit and the pulse output. The power source may be inverter based, and may include known topologies, such as with or without an output bypass switch, inverters, converters, secondary switches, etc. The particular control scheme is not important either.

Referring now to FIG. 1, a block diagram of a controlled short circuit and pulse welding system that implements the present invention is shown. Generally, a wire feeder 801 provides a wire 802 through a welding torch 804 to a weldment 803. A power source 805 (the power circuitry) provides power to welding torch 804 and a workpiece 806. A controller 807 includes a controlled short circuit control module 808, a process selection module 810, and a pulse module 809. Feedback is provided to controller 807 on lines 811–813. Control signals are provided by controller 807 on lines 814–816. Controller 807 may be part of power source 805, part of wire feeder 801, power source 805 may have a separate controller, or controller 807 may directly control the power converting of power source 805. The power is provided to weld cable 802 on a single output torch stud 820 (i.e., the stud to which the cable connected to the welding torch is connected), for both pulse and controlled short circuit power. A bypass output switch 818 and a resistor 819 are shown as part of power source 805. They are omitted, or located on wire feeder 801, or located in a separate housing in various embodiments.

Controller, as used herein, includes digital and analog circuitry, discrete or integrated circuitry, microprocessors, DSPs, etc., and software, hardware and firmware, located on one or more boards, used to control a device such as a power supply. Controlled short circuit control module, as used herein, is a control module that controls a power source to provide controlled short circuit power. Control module, as used herein, may be digital or analog, and includes hardware or software, that performs a specified control function. Controlled short circuit control module 808 is a waveform controlled short circuit control module in various embodiments that controls the power waveform to provide a waveform controlled short circuit output, and a mechanical controlled short circuit control module in other embodiments that provides a mechanical controlled short circuit output. Process selection module, as used herein, is a control module that selects or activates one of two or more process control modules, such as controlled short circuit control module 808 and pulse control module 809. Pulse module, as used herein, is a control module that causes a power source to provide a pulse output.

Process selection module 810 selects or activates either controlled short circuit control module 808 or pulse module 809 (but not both at the same time) depending on the process desired. It may do so in response to a user input, such as a user selectable process input (i.e., a switch or input on the wire feeder or power source front panel, or on the torch), or based on sensed parameters.

The preferred topology is one of the embodiments found in U.S. Pat. No. 6,087,626, wherein power source 805 is a PWM-inverter power source, such as that shown in U.S. Pat. No. 6,329,636, issued Dec. 11, 2001, entitled Method and Apparatus for Receiving a Universal Input Voltage in a Welding, Plasma or Heating Power Source (hereby incorporated by reference). Likewise, the preferred control scheme implemented by module 808 is described in U.S. Pat. No. 6,087,626. But other topologies and control schemes are used in alternative embodiments. In particular, the present invention is readily implemented with other known controlled short circuit power supply topology. The scheme implemented by module 809 is preferably a standard MIG pulse control.

One embodiment of the present invention is particularly well suited for use with a power source that includes bypass output switch 818. This includes an output selection switch 825 in power source 805 that links power source 805 for either pulse (without switch 818) or controlled short circuit (using switch 818). Switch 825 may be a knife switch or a relay, in various embodiments, and is omitted in the preferred embodiment.

Another embodiment provides for adjusting the output inductance to be lesser if the pulse mode is selected. The inductance may be greater by switching out an inductor 826 (for example using switch 825), or by controlling power source 805 to simulate a lesser inductance (i.e., control the output to provide current as if it had a larger output inductor).

An alternative embodiment provides for providing two output lines to a "combining" circuit located outside the power supply and wire feeder housing, for example in an add-on kit (in an external housing) that has a single torch output stud for a welding cable. The kit may include switch 825, and connects the torch stud to power source 805 through two cables from wire feeder 80, one cable for pulse and one for controlled short circuit power.

Other embodiments provide for additional output for other processes, such as stick, TIG, carbon are gouging, to be available on the single output stud. This is particularly appropriate when using a power source such as that shown in U.S. Pat. No. 6,329,636.

Numerous modifications may be made to the present invention which still fall within the intended scope hereof. Thus, it should be apparent that there has been provided in accordance with the present invention a method and apparatus for pulse and controlled short circuit welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type power supply comprising:
   a source of welding-type power having a control input;
   a controller, having a control output connected to the control input, and including a control led short circuit control module, a pulse module and a process selection module, wherein one of the controlled short circuit module and the pulse module are activated in response to the process selection module; and
   a workpiece output stud and a single torch output stud, connected to the source of welding-type power, wherein the single torch output stud provides controlled short circuit power having a first output inductance and pulse power having a second output inductance, wherein the second inductance is less than the first inductance.

2. The welding-type power supply of claim 1, further comprising a wire feeder, connected to the source of welding-type power, wherein the single torch output stud is located on the wire feeder.

3. The welding-type power supply of claim 1, wherein the source of welding-type power includes an inverter, without an output bypass switch.

4. The welding-type power supply of claim 1, wherein the source of welding-type power includes an inverter, with an output bypass switch.

5. The welding-type power supply of claim 1, wherein the source of welding-type power includes an output bypass switch.

6. The welding-type power supply of claim 1, further comprising a user selectable process input, connected to the process selection module.

7. The welding-type power supply of claim 6, wherein the user selectable process input is mounted on a torch.

8. The welding-type power supply of claim 6, wherein the user selectable process input is mounted on a wire feeder.

9. The welding-type power supply of claim 6, wherein the user selectable process input is mounted on a housing for the source of welding type power.

10. The welding-type power supply of claim 6, further comprising a wire feeder, capable of driving two types of wire, and connected to the source of welding-type power, wherein the single torch output stud is located on one of the wire feeder and an external housing.

11. The welding-type power supply of claim 1, further comprising an output selection switch having a control input connected and responsive to the process selection module, and in electrical communication with the single torch output stud and the source of welding-type power.

12. The welding-type power supply of claim 11, further comprising an output inductance in electrical communication with the output selection switch.

13. The welding-type power supply of claim 1, wherein the controlled short circuit module is a waveform controlled short circuit nodule.

14. The welding-type power supply of claim 1, wherein the controlled short circuit module is a mechanical controlled short circuit module.

15. A system for welding, comprising:
    a source of welding-type power capable of providing a controlled short circuit output having a first output inductance and a pulse output having a second output inductance in response to a user selection, wherein the second inductance is less than the first inductance;
    a workpiece output stud connected to the source of welding-type power; and
    a single torch output stud, connected to the source of welding-type power, that provides the selected controlled short circuit power or pulse power.

16. The welding-type power supply of claim 15, further comprising a wire feeder, connected to the source of welding-type power, wherein the single torch output stud is located on one of the wire feeder and an external housing.

17. The welding-type power supply of claim 16, wherein the source of welding-type power includes an inverter.

18. The welding-type power supply of claim 17, wherein the source of welding-type power further includes an output bypass switch connected to the output of the inverter.

19. The welding-type power supply of claim 18, further comprising an output selection switch having a control input connected and responsive to the user selectable process input, and in electrical communication with the single torch output stud and the source of welding-type power.

20. The welding-type power supply of claim 19, further comprising an output inductance in electrical communication with the output selection switch.

21. The welding-type power supply of claim 17, further comprising a user selectable process input; wherein the source of welding-type power is connected and responsive thereto.

22. The welding-type power supply of claim 21, wherein the user selectable process input is mounted on a torch.

23. The welding-type power supply of claim 21, wherein the user selectable, process input is mounted on the wire feeder.

24. The welding-type power supply of claim 21, wherein the user selectable process input is mounted on a housing for the source of welding type power.

25. The welding-type power supply of claim 17, further comprising a wire feeder, capable of driving two types of wire, and connected to the source of welding-type power, wherein the single torch output stud is located on the wire feeder.

26. The welding-type power supply of claim 16, wherein the source of welding-type power includes an output bypass switch responsive to the user selectable process input.

27. The welding-type power supply of claim 16, wherein the controlled short circuit module is a waveform controlled short circuit module.

28. The welding-type power supply of claim 16, wherein the controlled short circuit module is a mechanical controlled short circuit module.

29. A method of providing welding-type power comprising:
selecting one of a controlled short circuit output having a first output inductance and a pulse output having a second output inductance in response to a process selection, wherein the second inductance is less than the first inductance;
controlling a source of welding-type power to provide the controlled short circuit output across a workpiece output stud and a torch output stud, in the event the controlled short circuit output is selected; and
controlling the source of welding-type power to provide the pulse output, across the workpiece output stud and the torch output stud, in the event the pulse output is selected.

30. The method of claim 29, further comprising providing the selected output power to a wire feeder, wherein the torch output stud is located on one of the wire feeder and an external housing.

31. The method of claim 30, wherein controlling the source of welding-type power to provide the controlled short circuit output and controlling the source of welding-type power to provide the pulse output include controlling an inverter.

32. The method of claim 30, wherein selecting includes responding to a user selection.

33. The method of claim 29, a herein providing controlled short circuit welding power includes controlling a power waveform.

34. The method of claim 29, a herein providing controlled short circuit welding power includes mechanically controlling a wire.

35. The method of claim 29, wherein controlling the source of welding-type power to provide the controlled short circuit output includes switching an output bypass switch.

36. The method of claim 29, wherein controlling the source of welding-type power to provide the pulse output includes providing a lesser output inductance.

37. The method of claim 36, wherein providing a lesser output inductance includes controlling the source of welding-type power to simulate an inductance.

38. The method of claim 36, wherein providing a lesser output inductance includes providing the output though an inductor.

39. A method for welding, comprising providing a controlled short circuit output having a first output inductance and a pulse output having a second output inductance in response to a user selection across a workpiece output stud and a torch output stud wherein the second inductance is less than the first inductance.

40. The method of claim 39, further comprising providing the output to a wire feeder, wherein the torch output stud is located on one of the wire feeder and an external housing.

41. A welding-type power supply comprising:
power means for providing welding-type power;
controller means for controlling the power means to provide one of a controlled short circuit output having a first output inductance and a pulse output having a second output inductance in response to a process selection connected to the power module, wherein the second inductance is legs than the first inductance; and
a workpiece output stud and a single torch output stud, connected to the power means, wherein the single torch output stud provides controlled short circuit power and pulse power.

42. The welding-type power supply of claim 41, further comprising a wire feeder, connected to the source of welding-type power, wherein the single torch output stud is located on the wire feeder.

43. The welding-type power supply of claim 42, further comprising an output selection means for reconfiguring the power means in response to tie process selection connected to the process selection.

44. A system for pipe welding comprising:
a work stud;
a torch stud; and
power means for providing controlled short circuit welding power having a first output inductance across the work stud and the torch stud and performing the root pass using the controlled short circuit power, and for providing controlled pulse welding power having a second output inductance across the work stud and the torch stud and filling a groove using pulse power, wherein the second inductance is less than the first inductance.

45. The system of claim 44, wherein performing the root pass and filling the groove include melting a single type of wire.

46. The system of claim 44, wherein performing the root pass includes melting a first type of wire and filling the groove includes melting a second type of wire.

47. A welding-type power supply comprising:
selection means for selecting one of a controlled short circuit output having a first output inductance and a pulse output having a second output inductance in response to a process selection, wherein the second inductance is less than the first inductance;
means for controlling a source of welding-type power to provide the controlled short circuit output across a workpiece output stud and a torch output stud, in the event the controlled short circuit output is selected, and for controlling the source of welding-type power to provide the pulse output, across a workpiece output stud and a torch output stud, in the event the pulse output is selected.

48. A system for welding, comprising a workpiece output stud, a torch output stud, and means for providing a controlled short circuit output having a first output inductance and a pulse output having a second output inductance in response to a user selection across the workpiece output stud and the torch output stud, wherein the second inductance is less than the first inductance.

* * * * *